(12) United States Patent
Feng et al.

(10) Patent No.: US 12,489,107 B2
(45) Date of Patent: Dec. 2, 2025

(54) POWDER FOR USE IN THE NEGATIVE ELECTRODE OF A BATTERY AND A BATTERY COMPRISING SUCH A POWDER

(71) Applicant: UMICORE, Brussels (BE)

(72) Inventors: Kun Feng, Olen (BE); Boaz Moeremans, Olen (BE); Jean-Sébastien Bridel, Olen (BE)

(73) Assignee: UMICORE, Brussels (BE)

( * ) Notice: Subject to any disclaimer, the term of this patent is extended or adjusted under 35 U.S.C. 154(b) by 653 days.

(21) Appl. No.: 17/996,515

(22) PCT Filed: Apr. 13, 2021

(86) PCT No.: PCT/EP2021/059554
§ 371 (c)(1),
(2) Date: Oct. 19, 2022

(87) PCT Pub. No.: WO2021/213846
PCT Pub. Date: Oct. 28, 2021

(65) Prior Publication Data
US 2023/0207781 A1    Jun. 29, 2023

(30) Foreign Application Priority Data

Apr. 22, 2020 (EP) .................................... 20170769

(51) Int. Cl.
*H01M 4/587* (2010.01)
*H01M 4/36* (2006.01)
*H01M 4/38* (2006.01)
*H01M 4/02* (2006.01)

(52) U.S. Cl.
CPC ........... *H01M 4/364* (2013.01); *H01M 4/386* (2013.01); *H01M 4/587* (2013.01); *H01M 2004/027* (2013.01)

(58) Field of Classification Search
None
See application file for complete search history.

(56) References Cited

U.S. PATENT DOCUMENTS

| | | |
|---|---|---|
| 2016/0043384 A1 | 2/2016 | Zhamu et al. |
| 2020/0006753 A1 | 1/2020 | Nakajima et al. |
| 2021/0234157 A1 | 7/2021 | Liang et al. |

FOREIGN PATENT DOCUMENTS

| | | |
|---|---|---|
| CN | 105845890 A | 8/2016 |
| CN | 108075125 A | 5/2018 |
| EP | 2523241 A1 | 11/2012 |
| EP | 3238296 B1 | 11/2018 |
| JP | 2011503804 A | 1/2011 |
| JP | 5227483 B1 | 7/2013 |
| JP | 2014182873 A | 9/2014 |
| JP | 2018500742 A | 1/2018 |
| JP | 2018506145 A | 3/2018 |
| JP | 2019050178 A | 3/2019 |
| JP | 2019125435 A | 7/2019 |
| WO | 2009061685 A1 | 5/2009 |
| WO | 2016102098 A1 | 6/2016 |
| WO | 2016102208 A1 | 6/2016 |
| WO | 2019218503 A1 | 11/2019 |
| WO | 2019240021 A1 | 12/2019 |

OTHER PUBLICATIONS

ISA/EP; International Search Report and Written Opinion for International Patent Application No. PCT/EP2021/059554 dated Jun. 23, 2021, 12 pages.
Yang, Xuelin, et al., "Porous Graphite/Silicon Micro-Sphere Prepared by In-Situ Carbothermal Reducation and Spray Drying for Lithium Ion Batteries", ECS Solid State Letters, vol. 1, No. 2, Jul. 20, 2012, 3 pages.
"A Basic Guide to Particle Characterization", Malvern Instruments Worldwide—Inform White Paper, May 2, 2012, 26 pages.
Scherrer, P., "Determination of the size and internal structure of colloidal particles using X-rays", News from the Royal Society of Science in Gottingen: Mathematical-Physical Class from 1918, vol. 2, 1918, Jul. 26, 1918, 4 pages.

*Primary Examiner* — Tanisha Diggs
(74) *Attorney, Agent, or Firm* — Rimon P.C.; Allyn B. Elliott (57) ABSTRACT

A powder for use in a negative electrode of a battery, comprising a mixture of a first number-based fraction of particles comprising a carbonaceous matrix material and silicon-based particles dispersed therein, and a second number-based fraction of particles, comprising Si-free carbonaceous particles comprising graphitic domains having a mean size of at least 10 nm and at most 45 nm, as determined by the Scherrer equation applied to the powder's X-ray diffraction peak assigned to C(002) having an intensity IC with its maximum at $2\theta_{Cu}$ between 26° and 27°.

17 Claims, 2 Drawing Sheets

POWDER FOR USE IN THE NEGATIVE ELECTRODE OF A BATTERY AND A BATTERY COMPRISING SUCH A POWDER

CROSS-REFERENCE TO RELATED APPLICATIONS

This application is a U.S. National Stage application of International Patent Application No. PCT/EP2021/059554, filed on Apr. 13, 2021, which claims the benefit of European Patent Application No. 20170769.2, filed on Apr. 22, 2020.

TECHNICAL FIELD AND BACKGROUND

The present invention relates to a powder for use in the negative electrode of a battery and to a battery comprising such a powder.

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high-energy density combined with a good power performance.

A Li-ion battery typically contains a number of so-called Li-ion cells, which in turn contain a positive electrode, also called cathode, a negative electrode, also called anode, and a separator which are immersed in an electrolyte. The most frequently used Li-ion cells for portable applications are developed using electrochemically active materials such as lithium cobalt oxide or lithium nickel manganese cobalt oxide for the cathode and a natural or artificial graphite for the anode.

It is known that one of the important limitative factors influencing a battery's performance and in particular a battery's energy density is the active material in the anode. Therefore, to improve the energy density, the use of electrochemically active materials comprising silicon, in the negative electrode, has been investigated over the past years.

In the art, the performance of a battery containing Si-based electrochemically active powders is generally quantified by a so-called cycle life of a full-cell, which is defined as the number of times or cycles that a cell comprising such material can be charged and discharged until it reaches 80% of its initial discharge capacity. Most works on silicon-based electrochemically active powders are therefore focused on improving said cycle life.

A drawback of using a silicon-based electrochemically active material in an anode is its large volume expansion during charging, which is as high as 300% when the lithium ions are fully incorporated, e.g. by alloying or insertion, in the anode's active material—a process often called lithiation. The large volume expansion of the silicon-based materials during lithium incorporation may induce stresses in the silicon-based particles, which in turn could lead to a mechanical degradation of the silicon material. Repeated periodically during charging and discharging of the Li-ion battery, the repetitive mechanical degradation of the silicon-based electrochemically active material may reduce the life of a battery to an unacceptable level.

Further, a negative effect associated with silicon is that a thick SEI, a Solid-Electrolyte Interface, may be formed on the anode. A SEI is a complex reaction product of the electrolyte and lithium, which leads to a loss of lithium availability for electrochemical reactions and therefore to a poor cycle performance, which is the capacity loss per charging-discharging cycle. A thick SEI may further increase the electrical resistance of a battery and thereby limit its ability to charge and discharge at high currents.

In principle, the SEI formation is a self-terminating process that stops as soon as a 'passivation layer' has formed on the surface of the silicon-based material. However, because of the volume expansion of silicon-based particles, both silicon-based particles and the SEI may be damaged during discharging (lithiation) and recharging (de-lithiation), thereby freeing new silicon surface and leading to a new onset of SEI formation.

To solve the above-mentioned drawbacks, composite powders are usually used. In these composite powders, nano-sized silicon-based particles are mixed with at least one component suitable to protect the silicon-based particles from electrolyte decomposition and to accommodate volume changes. Such a component may be a carbon-based material, preferably forming a matrix.

The composite powders usually additionally contain graphitic particles, to adjust their specific capacity to a practical level, between 500 mAh/g and 1500 mAh/g.

Such composite powders are mentioned, for example, in EP 3238296 B1, wherein a mixture of particles comprising silicon domains embedded in a matrix and graphite particles—not embedded in a matrix—is disclosed. In EP 2523241 A1, a powder comprising a carbonaceous core with an amorphous carbon layer continuously formed on its surface and metallic particles, is disclosed. In X. Yang et al. (ECS Solid State Letters, 1 (2) M5-M7 (2012)), a powder comprising a mixture of nano-sized Si particles dispersed in a carbon matrix composed of graphite flakes and pyrolyzed carbon, is disclosed. In WO 2019/218503 A1, a composite carbon material with nano-silicon dispersed therein, where the composite carbon material includes a graphite crystalline phase and an amorphous carbon phase, is disclosed. In US 2020/006753 A1, an electrode containing a nano-silicon-containing substance, a multilayer graphene, a graphite material and a binding agent, is disclosed. In US 2016/043384 A1, an anode layer composition wherein an anode active material such as silicon is lodged in pores of a solid graphene foam, is disclosed.

Despite the use of such composite powders, there is still room for improvement of the performance of batteries containing Si-based electrochemically active powders. In particular, the existing composite powders do not allow achieving both a long cycle life and a high rate capability once used in a battery, which is essential, for example for fast charging of electric vehicles.

It is an object of the present invention to provide a stable electrochemically active powder comprising a mixture of silicon-based particles and graphitic particles, powder which once used in the negative electrode in the Li-ion battery, is advantageous in that it allows achieving a long cycle life combined to a high rate capability.

SUMMARY OF THE INVENTION

This objective is achieved by providing a powder according to Embodiment 1, said powder, which once used in the anode of the Li-ion battery, allows achieving a long cycle life and a high rate capability, as demonstrated in Examples 1 to 3 compared to Counterexamples 1 to 3.

The present invention concerns the following embodiments:

Embodiment 1

In a first aspect, the invention concerns a powder suitable for use in a negative electrode of a battery, comprising a mixture of:

a first number-based fraction of particles comprising a carbonaceous matrix material and silicon-based particles dispersed therein, and a second number-based fraction of particles, comprising Si-free carbonaceous particles comprising graphitic domains, said powder being characterized in that:

said graphitic domains comprised in the Si-free carbonaceous particles have a mean size of at least 10 nm and at most 45 nm, as determined by the Scherrer equation applied to the powder's X-ray diffraction peak assigned to C(002), having a maximum intensity $I_C$ at $2\theta_{Cu}$ between 26° and 27°, and said particles comprising a carbonaceous matrix material and silicon-based particles dispersed therein are free of graphitic domains having a size larger than 5 nm, preferably free of graphitic domains having a size larger than 2 nm.

By a powder suitable for use in the negative electrode of a battery is meant an electrochemically active powder, comprising electrochemically active particles, that are able to store and release lithium ions, respectively during the lithiation and the delithiation of the negative electrode of a battery. Such a powder may equivalently be referred to as "active powder".

By a mixture of a first fraction and a second fraction is meant that the powder comprises a mixture of two types of particles, the particles from the first fraction and the particles from the second fraction being distinct. Both fractions are different from zero.

Furthermore, in the powder according to the invention, particles from one fraction cannot be included in particles from the other fraction. In particular, the Si-free carbonaceous particles comprising graphitic domains having a mean size of at least 10 nm and at most 45 nm, cannot be present in the particles comprising the carbonaceous matrix material. There may however be some contacts between the particles from both fractions, located at their outer surface. This is even preferable in order to ensure a good electronic conductivity of the powder and thus a high rate capability of the battery comprising the powder.

By a number-based fraction of particles, it is meant a fraction of particles based on a visual analysis, with or without assistance of an image analysis program, of a minimum number of particles comprised in the powder. This minimum number of particles is at least 100 particles. An example of a determination of a number-based fraction of particles is provided in the "Analytical methods" section.

The silicon-based particles may have any shape, e.g. substantially spherical but also irregularly shaped, rod-shaped, plate-shaped, etc.

In the silicon-based particles, the silicon is present in its majority as silicon metal, to which minor amounts of other elements may have been added to improve properties, or which may contain some impurities, such as oxygen or traces of metals.

When considering all elements except oxygen, the average silicon content in such a silicon-based particle is preferably 80 weight % or more, and more preferably 90 weight % or more with respect to the total weight of the silicon-based particle.

By silicon-based particles dispersed in a matrix material is meant that the silicon-based particles either form agglomerates of a size smaller than 1 μm or do not for agglomerates at all, and are covered in their majority, preferably in their entirety, by the matrix material. Hence, in the powder according to Embodiment 1, the silicon-based particles are preferably in contact only with each other and/or with the matrix material.

The presence or absence of Si in a particle can, for example, be determined based on a Scanning Electron Microscopy with Energy Dispersive X-Ray (SEM-EDX) analysis of a cross-section of the powder. Since an involuntary contamination can never be excluded, a Si-free particle is here understood as a particle having a content of Si below 0.5 at %.

The presence or absence of graphitic domains having a size larger than 5 nm, preferably larger than 2 nm, in a particle, can for example be determined based on a Transmission Electron Microscopy (TEM) analysis. An example of such an analysis is provided in the "Analytical methods" section.

Even an amorphous carbonaceous matrix material might contain very small graphitic domains, with sizes below 5 nm, preferably below 2 nm. A powder comprising particles comprising a matrix material with silicon-based particles dispersed therein and such very small graphitic domains, is not excluded from being part of the invention.

Furthermore, the presence of graphitic domains having a size larger than 5 nm, preferably larger than 2 nm, in 1% or less in number of particles from a representative sample of at least 100 particles comprising a carbonaceous matrix material and silicon-based particles dispersed therein, comprised in the powder, is to be considered accidental and does not exclude such a powder from being part of the invention.

It is to be noted that the carbonaceous matrix comprising the silicon-based particles is amorphous, thus the C(002) peak observed in the X-ray diffractogram of the powder can only be attributed to the Si-free carbonaceous particles comprising graphitic domains having a mean size of at least 10 nm and at most 45 nm. If some, or even all, of the particles comprising a carbonaceous matrix material with silicon-based particles dispersed therein, also comprise graphitic domains having a size below 5 nm, preferably below 2 nm, the contribution of the latter to the C(002) peak observed in the X-ray diffractogram of the powder, both in terms of intensity and FWHM, is considered negligible.

For the avoidance of doubt, it is made clear that in this document the word "silicon" refers to the element Si in its metal (zerovalent) state, and the symbol "Si" refers to the element silicon irrespective of its oxidation state.

The Scherrer equation (P. Scherrer, Gatinger Nachrichten 2, 98 (1918)) is a well-known equation for calculating the size of ordered (crystalline) domains from X-Ray diffraction data. In order to avoid machine to machine variations, standardized samples can be used for calibration.

Graphitic domains having a mean size of at least 10 nm and at most 45 nm are equivalent, via the application of the Scherrer equation, to a C(002) peak in X-Ray Diffraction (XRD) having a full width at half maximum (FWHM) of at least 0.26° ($2\theta_{Cu}$) and at most 0.89° ($2\theta_{Cu}$).

The mixture of two different types of particles, with the Si-free carbonaceous particles comprising graphitic domains having a mean size of at least 10 nm and at most 45 nm, being distinct from the particles of matrix material comprising the silicon-based particles, is advantageous for two reasons:

the Si-free carbonaceous particles comprising graphitic domains having a mean size of at least 10 nm and at most 45 nm, ensure good electronic contacts between the particles comprising a matrix material with silicon-based particles dispersed therein, thus leading to a high electronic conductivity of the powder, and the Si-free carbonaceous particles comprising graphitic domains having a mean size of at least 10 nm and at most 45 nm, act as a spacer between the particles comprising a matrix material with silicon-based particles dispersed therein, thus avoiding an agglomeration of the latter, which would lead to a high volume expansion, fractures in the anode, a reduced cycle life of the battery and a low rate capability.

Graphitic materials consist of graphene planes or sheets, more or less well ordered along a certain direction (usually the c direction, hence the use of the 002 peak in XRD), perpendicular to the graphene planes. The size of the graphitic domains is understood as the mean distance, perpendicular to the graphene planes, over which graphene planes are well ordered, i.e. over which the graphitic ordering is maintained.

When the graphitic domains comprised in the Si-free carbonaceous particles are larger than 45 nm, the graphene planes are well ordered, the Si-free carbonaceous particles are highly crystalline and their specific surface (BET) is low. This reduces their capability to act as a spacer between the particles comprising a matrix material with silicon-based particles dispersed therein and to avoid an agglomeration of those latter, which has the negative consequences previously disclosed. Graphite is an example of carbonaceous material having graphitic domains larger than 45 nm.

When the graphitic domains comprised in the Si-free carbonaceous particles are smaller than 10 nm, the graphene planes are mostly disordered, the Si-free carbonaceous particles have a low crystallinity and their specific surface (BET) is high. This increases the surface of reaction with the electrolyte and thus enhances the formation of SEI layer, therefore increasing the initial irreversible capacity loss of a battery containing such a powder beyond what is commonly accepted. Pure graphene powder is an example of carbonaceous material having graphitic domains smaller than 10 nm.

In the powder according to the invention, the sum of the first number-based fraction of particles and the second number-based fraction of particles cannot exceed 1. This sum can be lower than 1, in case the powder comprises more than two fractions of particles.

Embodiment 2

In a second embodiment according to Embodiment 1, the mean size of the graphitic domains comprised in the Si-free carbonaceous particles is at least 12 nm and at most 39 nm.

Embodiment 3

In a third embodiment according to Embodiment 1 or 2, the powder, when analyzed by X-ray Diffraction (XRD), has a XRD diffractogram with a peak assigned to C(002), having a maximum intensity $I_C$ at $2\theta_{Cu}$ between 26° and 27° and a peak assigned to Si(111), having a maximum intensity $I_S$ at $2\theta_{Cu}$ between 28° and 29°, the ratio $I_C/I_S$ being larger or equal to 0.2 and smaller or equal to 2.0, preferably smaller or equal to 1.5, more preferably smaller or equal to 1.0.

When the ratio $I_C/I_S$ is higher than 2.0, preferably higher than 1.5, more preferably higher than 1.0, the graphene planes are well ordered, the Si-free carbonaceous particles comprising graphitic domains are highly crystalline and their specific surface (BET) is low, possibly decreasing their ability to act as a spacer. This is disadvantageous for the reasons previously given.

When the ratio $I_C/I_S$ is lower than 0.2, the graphene planes are mostly disordered, the Si-free carbonaceous particles comprising graphitic domains have a low crystallinity and their specific surface (BET) is high. This is disadvantageous for the reasons previously given.

Embodiment 4

In a fourth embodiment according to any one of the Embodiments 1 to 3, the Si-free carbonaceous particles comprising graphitic are characterized by a number-based size distribution with a d50, the d50 being smaller than or equal to 25 μm and larger than or equal to 6 μm, preferably larger than or equal to 8 μm.

The number-based size distribution is based on a visual analysis, with or without assistance of an image analysis program, of a minimum number of Si-free carbonaceous particles comprising graphitic domains comprised in the powder. This minimum number of Si-free carbonaceous particles comprising graphitic domains is at least 100 particles. An example of a determination of a number-based fraction of particles is provided in the "Analytical methods" section.

Si-free carbonaceous particles comprising graphitic domains having a number-based size distribution with a d50 smaller than 6 μm, preferably smaller than 8 μm, may have a too high specific surface and thus increase the surface of reaction with the electrolyte, which is disadvantageous for the reasons previously explained.

Si-free carbonaceous particles comprising graphitic domains having a number-based size distribution with a d50 larger than 25 μm may be unable to ensure good electronic contacts between the particles comprising a matrix material with silicon-based particles dispersed therein, thus leading to a reduced electronic conductivity of the powder and a reduced rate capability of the battery comprising such a powder.

Embodiment 5

In a fifth embodiment according to any one of the Embodiments 1 to 4, the Si-free carbonaceous particles comprising graphitic domains are made of at least one of the following materials: exfoliated graphite, expanded graphite, graphene nanoplatelets.

Graphite is a three-dimensional material consisting of large stacks of graphene sheets or planes ordered along a direction perpendicular to the graphene sheets. The mean distance along which the graphitic ordering is maintained, is large (>45 nm). Graphite is thus not suitable as Si-free carbonaceous particle comprising graphitic domains having a mean size of at least 10 nm and at most 45 nm. Exfoliated graphite or expanded graphite is graphite that was intercalated with a substance (e.g. sulphuric acid) which was subsequently vaporized, leading to a sudden expansion of the graphene sheets interlayer distance. This results in a partial disordering of the alignment of the graphene sheets and thus a reduced size of the stacks of graphene sheets and of the graphitic domains (<45 nm).

Graphene nanoplatelets are nanoparticles consisting of small stacks of graphene sheets having a platelet shape that are identical to those found in the walls of carbon nanotubes, but in a planar form. The size of the stacks of graphene sheets is in the same range as the one of exfoliated graphite.

Finally, a complete exfoliation of graphite results in graphene, which consists of graphene sheets randomly ordered, with no or nearly no graphitic ordering and thus small graphitic domains (<10 nm).

Figure 1:
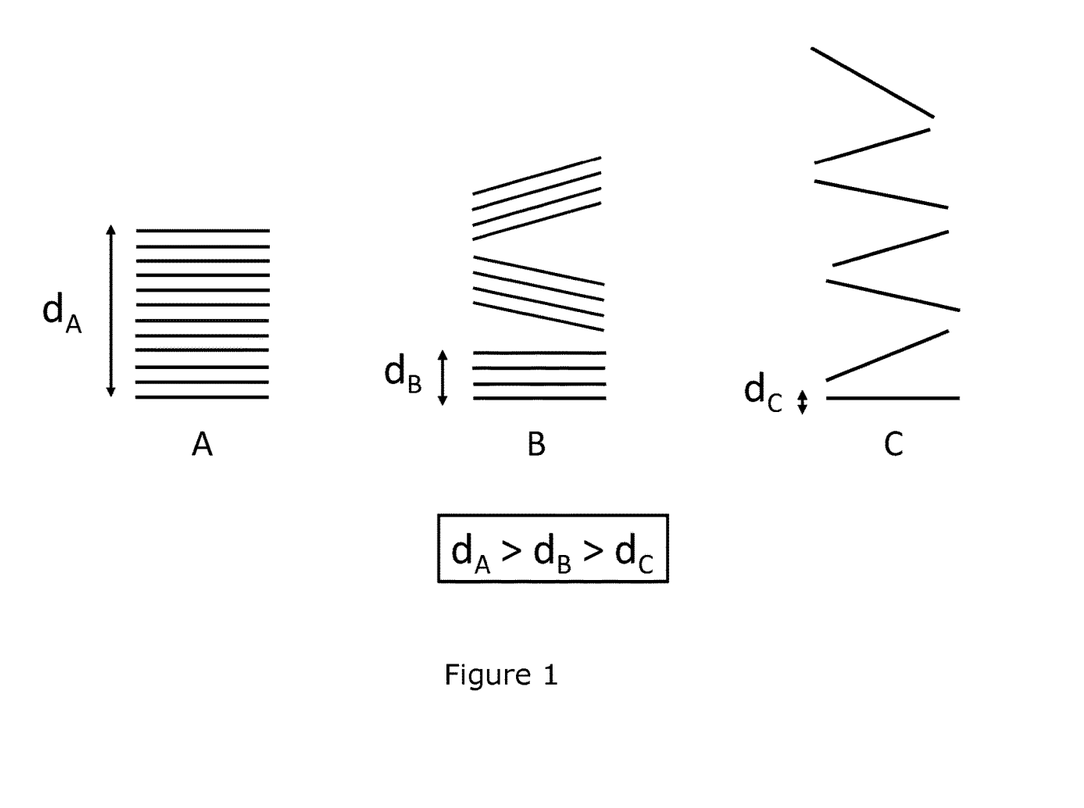
FIG. 1. Schematic representation of the graphitic domains in graphite (A), exfoliated/expanded graphite and graphene nanoplatelets (B) and graphene (C). dA, dB and dC give an indication of the size of the respective graphitic domains.
Figure 2:
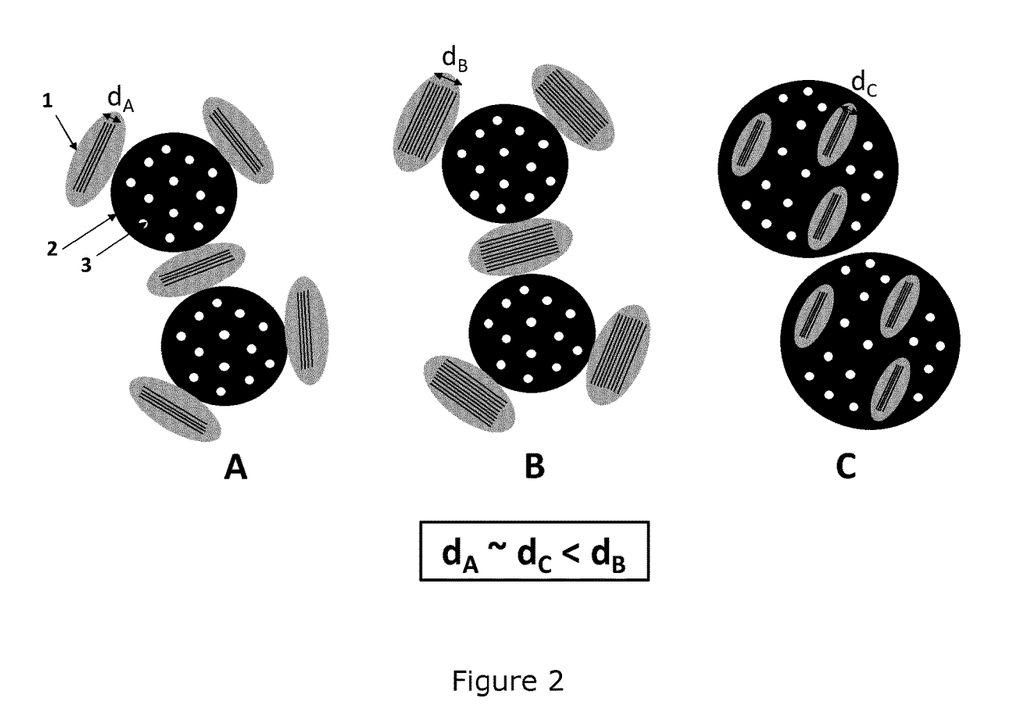
FIG. 2. Schematic representation of the powders according to Example 1 (A), to Counterexample 1 (B) and to Counterexample 3 (C). 1: Si-free carbonaceous particle comprising graphitic domains; 2: particle comprising a matrix material and silicon-based particles dispersed therein; 3: silicon-based particle. dA, dB and dC give an indication of the size of the respective graphitic domains.

A schematic representation of these different categories of materials is given in FIG. 1.

Embodiment 6

In a sixth embodiment according to any one of the Embodiments 1 to 5, the silicon-based particles are characterized by a number-based size distribution with a d50, the d50 being larger than or equal to 20 nm and smaller than or equal to 150 nm.

The number-based size distribution is based on a visual analysis, with or without assistance of an image analysis program, of a minimum number of silicon-based particles comprised in the powder. This minimum number of silicon-based particles is at least 100 particles. An example of a determination of a number-based fraction of particles is provided in the "Analytical methods" section.

Silicon-based particles having a number-based size distribution with a d50 lower than 20 nm are very difficult to disperse efficiently in the matrix material, which may decrease the electronic conductivity of the powder.

Silicon-based particles having a number-based size distribution with a d50 larger than 150 nm are more subject to fractures during their lithiation, causing a dramatic reduction of the cycle life of a battery containing such a powder.

Embodiment 7

In a seventh embodiment according to any one of the Embodiments 1 to 6, the powder has a silicon content C expressed in weight percent (wt %), wherein 10 wt %≤C≤60 wt %.

Embodiment 8

In an eighth embodiment according to any one of the Embodiments 1 to 7, the powder has a silicon content C and an oxygen content D, both expressed in weight percent (wt %), wherein D≤0.15 C.

A too high oxygen content may cause an additional irreversible consumption of lithium by the formation of lithium oxide ($Li_2O$) during the first lithiation of the powder, thus increasing the initial irreversible capacity loss of a battery containing such a powder.

Embodiment 9

In a ninth embodiment according to any one of the Embodiments 1 to 8, the first number-based fraction of particles is at least 0.2 and at most 0.8, with respect to a minimum number of 100 particles comprised in the powder.

In other words, 20% to 80% of the at least 100 particles observed in the powder are particles comprising a matrix material with silicon-based particles dispersed therein.

Embodiment 10

In a tenth embodiment according to any one of the Embodiments 1 to 9, the second number-based fraction of particles is at least 0.2 and at most 0.8, with respect to a minimum number of 100 particles comprised in the powder.

In other words, 20% to 80% of the at least 100 particles observed in the powder are Si-free carbonaceous particles comprising graphitic domains having a mean size of at least 10 nm and at most 45 nm, as determined by the Scherrer equation applied to the powder's X-ray diffraction peak assigned to C(002) having an intensity $I_C$ with its maximum at $2\theta_{Cu}$ between 26° and 27°.

Embodiment 11

In an eleventh embodiment according to any one of the Embodiments 1 to 10, the powder comprises pores. The pores may be located in the Si-free carbonaceous particles comprising graphitic domains and/or in the particles comprising matrix material with silicon-based particles dispersed therein.

Pores may be beneficial in that they can buffer the volume expansion of the particles of the powder during the lithiation/delithiation of the latter, thereby reducing the stress induced and the cracks that may appear in the particles of the powder, thereby increasing the cycle life.

Pores may be visualized by a SEM analysis of a cross-section of the powder.

Embodiment 12

In a twelfth embodiment according to any one of the Embodiments 1 to 11, the powder comprises particles having a volume-based particle size distribution having a D10, a D50 and a D90, with 1 μm≤D10≤10 μm, 8 μm≤D50≤25 μm and 10 μm≤D90≤40 μm.

Embodiment 13

In a thirteenth embodiment according to any one of the Embodiments 1 to 12, the powder has a BET surface area which is at most 10 $m^2/g$ and preferably at most 5 $m^2/g$.

It is important for the powder to have a low BET specific surface area, to decrease the surface of electrochemically active particles in contact with the electrolyte, in order to limit the Solid Electrolyte Interphase (SEI) formation, which consumes lithium, and thus to limit the irreversible loss of capacity of a battery containing such a powder.

Embodiment 14

In a fourteenth embodiment according to any one of the Embodiments 1 to 13, the matrix material is a product of the thermal decomposition of at least one of the following materials: polyvinyl alcohol (PVA), polyvinyl chloride (PVC), sucrose, coal-tar pitch, petroleum pitch, lignin, and a resin.

The product of the thermal composition of at least one of these materials is amorphous carbon, thus not contributing to the C(002) peak observed in the X-ray diffractogram of the powder acquired during an XRD analysis.

Embodiment 15

In a fifteenth embodiment, the invention finally concerns a battery comprising the powder of any one of the Embodiments 1 to 14.

DETAILED DESCRIPTION

In the following detailed description, preferred embodiments are described in detail to enable practice of the invention. Although the invention is described with reference to these specific preferred embodiments, it will be understood that the invention is not limited to these preferred embodiments. To the contrary, the invention includes numerous alternatives, modifications and equivalents as will become apparent from considering the following detailed description.
Analytical Methods Used
Determination of the Si Content The Si content of the powders in the examples and the counterexamples is measured by X-Ray Fluorescence (XRF) using an energy dispersive spectrometer. This method has an experimental random error of +/−0.3 wt % Si.
Determination of the Oxygen Content The oxygen content of the powders in the examples and the counterexamples is determined by the following method, using a LECO TC600 oxygen-nitrogen analyzer. A sample of the powder is put in a closed tin capsule that is put itself in a nickel basket. The basket is put in a graphite crucible and heated under helium as carrier gas to above 2000° C. The sample thereby melts and oxygen reacts with the graphite from the crucible to CO or $CO_2$ gas. These gases are guided into an infrared measuring cell. The observed signal is recalculated to an oxygen content.
Determination of the Specific Surface Area (BET)

The specific surface area is measured with the Brunauer-Emmett-Teller (BET) method using a Micromeritics Tristar 3000. 2 g of the powder to be analyzed is first dried in an oven at 120° C. for 2 hours, followed by $N_2$ purging. Then the powder is degassed in vacuum at 120° C. for 1 hour prior to the measurement, in order to remove adsorbed species.
Determination of the Electrochemical Performance The electrochemical performance of the powders in the examples and the counterexamples is determined by the following method.

The powders to be evaluated are sieved using a 45 µm sieve and mixed with carbon black, carbon fibers and sodium carboxymethyl cellulose binder in water (2.5 wt %). The ratio used is 89 weight parts active material powder/1 weight part carbon black (C65)/2 weight parts carbon fibers (VGCF) and 8 weight parts carboxymethyl cellulose (CMC). These components are mixed in a Pulverisette 7 planetary ball mill for 30 minutes at 250 rpm.

A copper foil cleaned with ethanol is used as current collector for the negative electrode. A 200 µm thick layer of the mixed components is coated on the copper foil. The coating is dried for 45 minutes in vacuum at 70° C. A 13.86 $cm^2$ rectangular shaped electrode is punched from the dried coated copper foil, dried overnight at 110° C. under vacuum and used as negative electrode in a pouch-cell.

The positive electrode is prepared as follows: a commercial $LiNi_{3/5}Mn_{1/5}Co_{1/5}O_2$ (NMC 622) powder is mixed with carbon black (C65), carbon fibers (VGCF) and a solution of 8 wt % polyvinylidene difluoride (PVDF) binder in N-Methyl-2-pyrrolidone (NMP). The ratio used is 92 weight parts of a commercial NMC 622 powder/1 weight part carbon black/3 weight parts carbon fibers and 4 weight parts PVDF. The components are mixed in a Pulverisette 7 planetary ball mill for 30 minutes at 250 rpm. An aluminum foil cleaned with ethanol is used as current collector for the positive electrode. A layer of the mixed components is coated on the aluminum foil, with a thickness ensuring a ratio negative electrode capacity over positive electrode capacity of 1.1. The coating is dried for 45 minutes in vacuum at 70° C. A 11.02 $cm^2$ rectangular shaped electrode is punched from the dried coated aluminum foil, dried overnight at 110° C. under vacuum and used as positive electrode in a pouch-cell.

The electrolyte used is 1M $LiPF_6$ dissolved in EC/DEC solvents (1/1 in volume)+2 wt % VC+10 wt % FEC additives.

The assembled pouch-cells are then tested using the procedure described below, where the first cycle corresponds to the conditioning of the battery and where "CC" stands for "constant current" and "CCCV" stands for "constant current constant voltage".

Cycle 1 (conditioning)
    CC charge at 0.025 C until 15% of theoretical cell capacity is reached
    Rest 12 h
    CC charge at 0.05 C to 4.2V
    Rest 5 min
    CC discharge at 0.05 C to 2.7V
Fast-charge test cycle 2 (reference cycle)
    Rest 5 minutes
    CC charge at 0.1 C to 4.2V
    Rest 5 min
    CC discharge at 0.1 C to 2.7V
Fast-charge test cycle 3
    Rest 5 minutes
    CC charge at 0.2 C to 4.2V
    Rest 5 min
    CC discharge at 0.2 C to 2.7V
Fast-charge test cycles 4, 5, 6, 7 and 8
    Rest 5 minutes
    CC charge at 0.5 C (cycle 4)—at 1 C (cycle 5)—at 2 C (cycle 6)—at 3 C (cycle 7)—at 5 C (cycle 8) to 4.2V
    Rest 5 min
    CC discharge at 0.1 C to 2.7V for all cycles
From cycle 9 on:
    Rest 5 min
    CC charge at 0.5 C to 4.2V, then CV charge until C/20
    Rest 5 min
    CC discharge at 0.5 C to 2.7V The rate capability is measured here as the charge capacity at a rate of 0.1 C, 0.2 C, 0.5 C, 1 C, 2 C, 3 C and 5 C expressed as a percentage of the rate at 0.1 C. 0.1 C corresponds to the current which theoretically allows charging the cell in 10 hours at constant current. 1 C, for example, is a current which is 10 times higher than the 0.1 C current, and which theoretically allows charging the cell in 1 hour.

The coulombic efficiency (CE) of the pouch-cell, being the ratio of the capacity at discharge to the capacity at charge at a given cycle, is calculated for the initial cycle. The initial cycle is the most important one in terms of coulombic efficiency, since the reaction of SEI formation has a huge impact on the CE.

Furthermore, it is well established that a cycle life of at least 150 cycles in such a pouch-cell is required for an anode material with a specific capacity of about 1300 mAh/g, in view of a commercial application. These high capacity powders may be further diluted during the negative electrode preparation, for example with graphite, to capacities of 600-700 mAh/g to achieve a cycle life beyond 300 cycles.

Determination of a Number-Based Fraction of Particles in the Powder

A number-based fraction of particles in the powder is determined via an electron microscopy analysis (SEM or TEM) of a cross-section of the powder, combined with an image analysis, preferably assisted by an image analysis program.

To do this, a cross-section of the powder to be analyzed, comprising multiple cross-sections of particles from both fractions (i.e. cross-sections of particles comprising a matrix material and silicon-based particles dispersed therein and cross-sections of Si-free carbonaceous particles comprising graphitic domains), is prepared following the procedure described below. In that case, the size of a particle is considered to be equivalent to the maximum straight-line distance between two points on the perimeter of a discrete cross-section of that particle, also called $d_{max}$.

To perform the analysis using a SEM equipment, the sample preparation is performed as follows. 500 mg of the powder to be analyzed is embedded in 7 g of a resin (Buehler EpoxiCure 2) consisting of a mix of 4 parts Epoxy Resin (20-3430-128) and 1 part Epoxy Hardener (20-3432-032). The resulting sample of 1" diameter is dried during at least 8 hours. It is then polished, first mechanically using a Struers Tegramin-30 until a thickness of maximum 5 mm is reached, and then further polished by ion-beam polishing (Cross Section Polisher Jeol SM-09010) for about 6 hours at 6 kV, to obtain a polished surface. A carbon coating is finally applied on this polished surface by carbon sputtering using a Cressington 208 carbon coater for 12 seconds, to obtain the sample, also called "cross-section", that will be analyzed by SEM.

The cross-section is then analyzed using a FEG-SEM JSM-7600F from JEOL equipped with an EDS detector Xflash 5030-127 from Bruker (30 mm$^2$, 127 eV). The signals from this detector are treated by the Quantax 800 EDS system from Bruker.

The enlargements are generated by applying a voltage of 15 kV at a working distance of several millimeters. The images from the backscattered electrons are reported when adding value to the images from the optical microscope.

In the case of a TEM analysis, 10 mg of the powder to be analyzed is placed in a focused ion beam scanning electrode microscope (FIB-SEM) equipment. A platinum layer is deposited on top of the active surface of the active material powder. A lamella of the active material powder is extracted using the FIB. This lamella is further placed on a TEM sample holder and analyzed following the procedure described below.

For the purpose of illustrating, in a non-limitative way, the determination of the number-based fraction of particles in the powder, a TEM-based procedure is provided below.

1. Multiple TEM images of the cross-section of the powder comprising both fractions of particles are acquired.
2. The contrast and brightness settings of the images are adjusted for an easy visualization of the cross-sections of the different types of particles, i.e. the particles comprising a matrix material and silicon-based particles dispersed therein and the Si-free carbonaceous particles comprising graphitic domains. Due to their different chemical composition, the difference in brightness allows for an easy distinction between the different types of particles and the matrix.
3. At least 100 discrete cross-sections of particles, not overlapping with another cross-section of a particle, are selected from one or several of the acquired TEM image(s), using a suitable image analysis program. These discrete cross-sections may be selected from one or more cross-sections of the powder comprising the particles.
4. For each of the at least 100 selected discrete cross-sections of particles, it is determined whether it is a cross-section of a particle comprising a carbonaceous matrix material and silicon-based particles dispersed therein, a cross-section of a Si-free carbonaceous particle comprising graphitic domains or a cross-section of another type of particle. The fraction of particles comprising a carbonaceous matrix material and silicon-based particles dispersed in it and the fraction of Si-free carbonaceous particles comprising graphitic domains are then finally calculated.

Note that the TEM analysis described before allows checking whether the Si-free carbonaceous particles indeed contain graphitic domains and allows measuring the size of the graphitic domain, for each particle. In case it would be too complex and work-intensive to measure the size of the graphitic domain for each of the particles, it may be enough to measure the mean size of the graphitic domains for the whole sample of powder via an XRD analysis, as will be detailed in a following section, and to consider that all graphitic domains comprised in Si-free carbonaceous particles have this mean size. That way, a SEM analysis, which allows to differentiate between particles comprising a carbonaceous matrix material and silicon-based particles dispersed in it and Si-free carbonaceous particles comprising graphitic domains, may be sufficient.

Determination of the Number-Based Particle Size Distribution

The number-based particle size distribution of the silicon-based particles and/or of the Si-free carbonaceous particles comprising graphitic domains, comprised in the powders according to the invention is determined via an electron microscopy analysis (SEM or TEM) of a cross-section of the powder, combined with an image analysis, preferably assisted by an image analysis program. The preparation of the sample to be analyzed is the same as previously detailed.

For the purpose of illustrating, in a non-limitative way, the determination of the particle size distribution of the silicon-based particles and/or of the Si-free carbonaceous particles comprising graphitic domains, comprised in the powder, a TEM-based procedure is provided below.

1. Multiple TEM images of the cross-section of the powder comprising multiple cross-sections of silicon-based particles and of Si-free carbonaceous particles comprising graphitic domains, are acquired.
2. The contrast and brightness settings of the images are adjusted for an easy visualization of the cross-sections of the different types of particles, i.e. the particles of matrix material comprising silicon-based particles and the Si-free carbonaceous particles comprising graphitic domains. Due to their different chemical composition, the difference in brightness allows for an easy distinction between the different types of particles and the matrix.
3. At least 100 discrete cross-sections of silicon-based particles and/or at least 100 discrete cross-sections of Si-free carbonaceous particles comprising graphitic domains, not overlapping with another cross-section of a particle, are selected from one or several of the acquired TEM image(s), using a suitable image analysis program. These discrete cross-sections may be selected from one or more cross-sections of the powder comprising the particles.

4. $d_{max}$ values of the at least 100 discrete cross-sections of the silicon-based particles and/or of the at least 100 discrete cross-sections of Si-free carbonaceous particles comprising graphitic domains, are measured, preferably using a suitable image analysis program.

The d10, d50 and d90 values of the number-based particle size distribution of silicon-based particles and/or of the Si-free carbonaceous particles comprising graphitic domains, determined using the method described above, are then calculated. These number-based particle size distributions can be readily converted to a weight- or a volume-based particle size distribution via well-known mathematical equations.

Determination of the Volume-Based Particle Size Distribution

The volume-based particle size distribution of the silicon-based powder is determined by centrifugal sedimentation with the Centrifugal Photosedimentometer DC20000 (CPS Instruments, Inc, USA).

The instrument is equipped with a hollow polycarbonate disc with an internal radius of 4.74 cm. Rotational speed is set to 20000 rpm which corresponds to a centrifugal acceleration force of approx. $1.9 \times 10^5$ m/s$^2$.

The disc is filled with 16 ml of a linear density gradient (10 to 5%) of Halocarbon 1.8 (chlorotrifluoroethylene—PCTFE) in 2-butoxyethylacetate (casrn112-07-2).

As reference material—to calculate the sedimentation constant—diamond particles with a mean diameter of 0.52 μm and a specific density of 3.515 g/cm$^3$ are used.

Sample Preparation:

A 10 wt % suspension in Isopropanol of the silicon-based powder to be analyzed is prepared using ultrasound (Branson sonifier 550 W). The suspension is diluted with butoxyethylacetate to a final concentration of 0.05 weight % silicon. 0.050 ml of the resulting sample is injected in the disc and light absorbance is recorded as a function of time at a wavelength of 470 nm.

The resulting time-absorbance curve is converted to a particle size distribution (mass or volume) with a build-in algorithm (DCCS software) and using the following parameters:

Spin fluid density: 2.33 g/cm$^3$
Spin fluid refractive index: 1.482
Silicon density: 2.33 g/cm$^3$
Silicon refractive index: 4.49
Silicon adsorption coefficient: 17.2 K A volume-based particle size distribution of the silicon-based powder, specifying the D10, D50 and D90 values, was determined using the methods described above.

The volume-based particle size distribution of the powders according or not to the invention, is determined by Laser Diffraction Sympatec (Sympatec-Helos/BFS-Magic 1812), following the user instructions. The following settings are used for the measurement:

Dispergen system: Sympatec-Rodos-M
Disperser: Sympatec-Vibri 1227
Lens: R2 (0.45-87.5 μm range)
Dispersion: Pressured air at 3 bars
Optical concentration: 3-12%
Start/stop: 2%
Time base: 100 ms
Feed rate: 80%
Aperture: 1.0 mm It must be noted that feed rate and aperture settings can vary in function of the optical concentration.

The D10, D50 and D90 values of the volume-based particle size distributions of the powders, according or not to the invention, determined using the methods described above, are then calculated.

Determination of the Size of the Graphitic Domains

The size of the graphitic domains may be determined via a TEM analysis of a cross-section of the powder, as previously explained.

However, the preferred method is an X-ray diffraction (XRD) analysis of the powder. The following method is used.

XRD measurements are performed on a Panalytical 'X Pert Pro system with CuKα1 and CuKα2 radiation, λ=0.15418 nm, with a step size of 0.017° 2θ, scan rate of 34 minutes (2064 seconds) and measuring from 5° to 90° 2θ on a flattened surface of about 2 cm$^3$ powder material at least, using the ICDD database, PDF-4+, for the identification of present compounds.

The XRD peak having a maximum at $2\theta_{Cu}$ between 26° and 27° corresponds to the (002) reflection of graphitic carbon, which results from diffraction of X-rays from inter-plane graphene layers. The background is first subtracted from the raw XRD data. The $2\theta_{Cu}$ values at half maximum intensity on the left side and the right side of the C(002) peak are then determined. The Full Width at Half Maximum (FWHM) value is the difference between these two $2\theta_{Cu}$ values. The FWHM value is normally determined using the program provided with the X-Ray diffractometer. A manual calculation may be used as well.

The mean size of the graphitic domains comprised in the Si-free carbonaceous particles is finally calculated by applying the Scherrer equation to the C(002) peak, using the FWHM value just measured, the X-ray wavelength of the equipment and the position of the C(002) peak.

Determination of the Ratio $I_C/I_S$

The powder is analyzed using the X-ray diffraction method previously described. After subtracting the background from the raw XRD data, the maximum intensity $I_C$ of the peak assigned to C(002) at $2\theta_{Cu}$ between 26° and 27° and the maximum intensity $I_S$ of the peak assigned to Si(111) at $2\theta_{Cu}$ between 28° and 29°, are measured either with a program or manually. The ratio $I_C/I_S$ is then calculated.

EXPERIMENTAL PREPARATION OF COUNTEREXAMPLES AND EXAMPLES

Example 1 (E1), According to the Invention

To produce the powder of Example 1, a silicon-based powder is first obtained by applying a 60 kW radio frequency (RF) inductively coupled plasma (ICP), using argon as plasma gas, to which a micron-sized silicon powder precursor is injected at a rate of circa 50 g/h, resulting in a prevalent (i.e. in the reaction zone) temperature above 2000K. In this first process step, the precursor becomes totally vaporized. In a second process step, an argon flow of 18 Nm$^3$/h is used as quench gas immediately downstream of the reaction zone in order to lower the temperature of the gas below 1600K, causing a nucleation into metallic submicron silicon powder. Finally, a passivation step is performed at a temperature of 100° C. during 5 minutes by adding 100 l/h of a $N_2/O_2$ mixture containing 1 mole % oxygen.

The specific surface area (BET) of the obtained silicon powder is measured to be 83 m$^2$/g. The oxygen content of the obtained silicon powder is measured to be 8.6 wt %. The volume-based particle size distribution of the silicon powder is determined to be: D10=62 nm, D50=112 nm and D90=198 nm.

Then, a blend is made of 26 g of the obtained silicon-based powder and 38 g of petroleum-based pitch powder.

This blend is heated to 450° C. under $N_2$, so that the pitch melts, and, after a waiting period of 60 minutes, mixed for 30 minutes under high shear by means of a Cowles dissolver-type mixer operating at 1000 rpm.

The mixture of the silicon-based powder in pitch thus obtained is cooled under $N_2$ to room temperature and, once solidified, pulverized and sieved on a 400-mesh sieve, to produce an intermediate powder.

20 g of the intermediate powder is then mixed with 7 g of Si-free carbonaceous particles comprising graphitic domains, being graphene nanoplatelets (XG Sciences xGnP® graphene nanoplatelets—grade H), for 3 hours on a roller bench, after which the obtained mixture is passed through a mill to de-agglomerate it. At these conditions good mixing is obtained but the graphene nanoplatelets (i.e. the Si-free carbonaceous particles comprising graphitic domains) do not become embedded in the pitch.

A thermal after-treatment is further given to the obtained mixture of the intermediate powder and the graphene nanoplatelets as follows: the product is put in a quartz crucible in a tube furnace, heated up at a heating rate of 3° C./min to 1000° C., kept at that temperature for two hours and then cooled. All this is performed under argon atmosphere.

The fired product is finally manually crushed in a mortar and sieved over a 325-mesh sieve to form a final powder.

The total Si content in this powder is measured to be 34.6 wt % by XRF, having an experimental error of +/−0.3 wt %. This corresponds to a calculated value based on a weight loss of the pitch upon heating of circa 35 wt % and an insignificant weight loss upon heating of the other components. The oxygen content of this powder was measured to be 3.4 wt %. The specific surface area (BET) of the obtained powder is measured to be 4.1 m²/g. The volume-based particle size distribution of the powder has a D10 equal to 4.1 μm, a D50 equal to 13.3 μm and a D90 equal to 28.8 μm.

The mean size of the graphitic domains, measured by XRD using the Scherrer equation, is equal to 13 nm. The ratio $I_C/I_S$ of intensities of the XRD peak assigned to C(002) having its maximum at $2\theta_{Cu}$ between 26° and 27° to the peak assigned to Si(111) having its maximum at $2\theta_{Cu}$ between 28° and 29°, is equal to 0.29.

Based on a visual analysis of 156 cross-sections of particles of the powder of Example 1 observed by TEM, 50 of those are particles containing only some matrix material with Si-based particles dispersed therein and 106 are Si-free carbonaceous particles comprising graphitic domains, which corresponds to a fraction of 0.32 of particles comprising a matrix material with silicon-based domains dispersed in it and to a fraction of 0.68 of Si-free carbonaceous particles comprising graphitic domains having a mean size of 13 nm, thus to a sum of fractions of 1. The number-based size distribution of the Si-free carbonaceous particles comprising graphitic domains in the powder has a d50 of 6.2 μm. Furthermore, pores can be observed in the particles of the powder.

Examples 2 and 3 (E2 and E3), According to the Invention

To produce the powders of Examples 2 (E2) and Example 3 (E3), the same procedure is used as for Example 1, except that a different type of Si-free carbonaceous particles comprising graphitic domains is mixed with the intermediate powder. E2 and E3 are prepared using 2 different types of expanded graphite powders, having different sizes of particles and comprising graphitic domains of different sizes. The results of the analyses performed on the powders from E2 and E3 are given in Table 1.

Both powders have a Si content and an O content comparable to the ones of the powder of Example 1. The BET values of the powders from E2 and E3 are 3.9 m²/g and 3.6 m²/g respectively. The volume-based particle size distribution of the powder from E2 has a D10 equal to 4.8 μm, a D50 equal to 14.3 μm and a D90 equal to 29.8 μm. The volume-based particle size distribution of the powder from E3 has a D10 equal to 5.2 μm, a D50 equal to 14.9 μm and a D90 equal to 30.8 μm.

Counterexamples 1 and 2 (CE1 and CE2), not According to the Invention

To produce the powders of Counterexample 1 (CE1) and Counterexample 2 (CE2), the same procedure as for Example 1 is used, except that a different type of Si-free carbonaceous particles comprising graphitic domains is mixed with the intermediate powder. CE1 is prepared using graphite particles with large graphitic domains (>100 nm). CE2 is prepared using graphene particles having very small graphitic domains (<2 nm).

It can be noted that the powder of Counterexample 1 is produced according to the teachings of prior art document EP 3238296 B1.

The results of the analyses performed on the powders from CE1 and CE2 are given in Table 1.

For both powders from CE1 and CE2, the fraction of particles comprising Si-free carbonaceous particles comprising graphitic domains having a mean size of at least 10 nm and at most 45 nm is equal to zero, since for CE1 the mean size of the graphitic domains is equal to 180 nm and for CE2 the mean size of the graphitic domains is inferior to 2 nm, both being determined by the Scherrer equation applied to the respective powder's X-ray diffraction peak assigned to C(002), having a maximum intensity $I_C$ at $2\theta_{Cu}$ between 26° and 27°.

Both powders have a Si content, an O content and a particle size distribution comparable to the ones of the powders from E1, E2 and E3. The BET of the powders from CE1 and CE2 are equal to 3.6 m²/g and 5.8 m²/g respectively.

Counterexample 3 (CE3), not According to the Invention

To produce the powder of Counterexample 3 (CE3), the same silicon-based powder as for Example 1 is used.

A blend is made of 26 g of the silicon-based powder, of 38 g of petroleum-based pitch powder and of 17.7 g of an expanded graphite powder having a volume-based particle size distribution with a D50 lower than 5 μm. This blend is heated to 450° C. under $N_2$, so that the pitch melts, and, after a waiting period of 60 minutes, mixed for 30 minutes under high shear by means of a Cowles dissolver-type mixer operating at 1000 rpm. At these conditions, the particles of expanded graphite (i.e. the Si-free carbonaceous particles comprising graphitic domains) become embedded in the pitch.

The mixture of the silicon-based powder and the expanded graphite powder in pitch thus obtained is cooled under $N_2$ to room temperature and, once solidified, pulverized and sieved on a 400-mesh sieve, to produce an intermediate powder.

A thermal after-treatment is further given to 27 g of this intermediate powder as follows: the product is put in a quartz crucible in a tube furnace, heated up at a heating rate of 3° C./min to 1000° C., kept at that temperature for two hours and then cooled. All this is performed under argon atmosphere.

The fired product is finally manually crushed in a mortar and sieved over a 325-mesh sieve to form a final powder.

The results of the analyses performed on the powder from CE3 is given in Table 1. The mean size of the graphitic domains, measured by XRD using the Scherrer equation, is equal to 26 nm.

Based on a visual analysis of 128 cross-sections of particles of the powder of Counterexample 3 observed by TEM, only one type of particles is present: particles comprising a matrix material with both silicon-based particles and Si-free carbonaceous particles comprising graphitic domains dispersed in it. Since all particles of the powder comprise graphitic domains having a mean size of 26 nm, the fraction of particles comprising a matrix material with silicon-based domains dispersed in it and being free of graphitic domains having a size larger than 5 nm, preferably larger than 2 nm, is equal to 0 and the fraction of particles comprising Si-free carbonaceous particles comprising graphitic domains is equal to 1.

The powder has a Si content and an O content comparable to the ones of the powders from E1, E2 and E3. The BET of the powder from CE3 is equal to 5.2 m²/g. The volume-based particle size distribution of the powder has a D10 equal to 6.5 μm, a D50 equal to 17.8 μm and a D90 equal to 35.6 μm.

Table 1: Physical properties of the powders E1-E3 and CE1-CE3. Fraction (1): Fraction of particles comprising a matrix material and silicon-based particles dispersed therein and being free of graphitic domains having a size larger than 5 nm. Fraction (2): Fraction of particles comprising Si-free carbonaceous particles comprising graphitic domains having a mean size of at least 10 nm and at most 45 nm.

Electrochemical Evaluation of the Powders

The produced powders are tested in full pouch-cells according to the procedure specified above. All powders tested have a specific capacity of 1300 mAh/g±10 mAh/g. All pouch cells have a theoretical initial charge capacity of 60 mAh±2 mAh. The results obtained for the initial coulombic efficiency and the cycle life are given in Table 2 and the results obtained for the rate capability are given in Table 3.

Regarding the cycle life, comparing the results of the powders from E1, E2 and E3—according to the invention—with the powder from CE1, it can be seen in E1, E2 and E3 that there is an increase in the cycle life with the decrease of the size of the graphitic domains and the decrease of the ratio $I_C/I_S$, for the possible reasons that have been previously given. A number-based particle size distribution with a low d50 for the Si-free carbonaceous particles comprising graphitic domains, combined with very small graphitic domains (CE2) leads to both a reduced cycle life and a low initial coulombic efficiency. The same is observed when only one type of particle is present (CE3).

Regarding the rate capability, comparing the results of the powders from E1, E2 and E3—according to the invention—with the powder from CE1, it can be seen in E1, E2 and E3 that there is an increase of the capacity charged at high current (i.e. high C-rate) with the decrease of the size of the graphitic domains and the decrease of the ratio $I_C/I_S$, for the possible reasons that have been previously given, in particular an increase of the electronic conductivity of the powders.

The presence of only one type of particle leads to a reduced capacity charged at high current, which may come from a reduced electronic conductivity of the powder CE3.

TABLE 2

Table 2: Performance of full-cells containing powders E1-E3 and CE1-CE3

| Example # | Initial coulombic efficiency (CE) in full cell (%) | Cycle at which 80% of cycle 9 discharge capacity is reached |
|---|---|---|
| E1 | 82.8 | 183 |
| E2 | 83.2 | 171 |
| E3 | 83.6 | 161 |
| CE1 | 83.5 | 149 |
| CE2 | 81.1 | 128 |
| CE3 | 81.4 | 137 |

TABLE 1

| Example # | Fractions (1) | Fractions (2) | Mean size of the graphitic domains (nm) | Ratio $I_C/I_S$ in XRD | Numerical d50 of the Si-free carbonaceous particles (μm) | Visual presence of pores |
|---|---|---|---|---|---|---|
| E1 | 0.32 | 0.68 | 13 | 0.29 | 6.2 | Yes |
| E2 | 0.34 | 0.66 | 27 | 0.68 | 12.6 | Yes |
| E3 | 0.35 | 0.65 | 39 | 1.13 | 20.3 | Yes |
| CE1 | 0.31 | 0.0 | 180 | 3.8 | 16.1 | No |
| CE2 | 0.29 | 0.0 | <2 | <0.1 | 2.8 | No |
| CE3 | 0.0 | 1.0 | 26 | 0.56 | 4.3 | Yes |

TABLE 3

Table 3: Rate capability of full-cells containing powders E1-E3 and CE1-CE3

| Example # | Charge capacity at 0.1 C (mAh) | 0.2 C vs 0.1 C (%) | 0.5 C vs 0.1 C (%) | 1 C vs 0.1 C (%) | 2 C vs 0.1 C (%) | 3 C vs 0.1 C (%) | 5 C vs 0.1 C (%) |
|---|---|---|---|---|---|---|---|
| E1 | 49.8 | 98.2 | 94.5 | 89.4 | 81.4 | 70.1 | 52.4 |
| E2 | 50.0 | 98.1 | 94.2 | 88.1 | 80.2 | 68.2 | 51.1 |
| E3 | 50.4 | 97.8 | 93.6 | 87.8 | 78.2 | 66.4 | 48.7 |
| CE1 | 50.0 | 96.7 | 91.4 | 85.4 | 74.8 | 63.1 | 42.6 |
| CE2 | 48.7 | 97.5 | 93.2 | 87.1 | 76.9 | 65.0 | 46.1 |
| CE3 | 48.9 | 95.6 | 89.9 | 83.5 | 70.3 | 58.4 | 36.5 |

The invention claimed is:

1. A powder for use in a negative electrode of a battery, comprising a mixture of:
    a first number-based fraction of particles comprising a carbonaceous matrix material and silicon-based particles dispersed therein, and
    a second number-based fraction of particles, comprising Si-free carbonaceous particles comprising graphitic domains,
    said powder being characterized in that:
    said graphitic domains comprised in the Si-free carbonaceous particles have a mean size of at least 10 nm and at most 45 nm, as determined by the Scherrer equation applied to the powder's X-ray diffraction peak assigned to C(002), having a maximum intensity $I_C$ at $2\theta_{Cu}$ between 26° and 27°, and
    said particles comprising a carbonaceous matrix material and silicon-based particles dispersed therein are free of graphitic domains having a size larger than 5 nm.

2. The powder according to claim 1, wherein the mean size of the graphitic domains is at least 12 nm and at most 39 nm.

3. The powder according to claim 1, characterized in that its X-ray diffractogram has a peak assigned to C(002), having a maximum intensity $I_C$ at $2\theta_{Cu}$ between 26° and 27° and a peak assigned to Si (111), having a maximum intensity $I_S$ at $2\theta_{Cu}$ between 28° and 29°, the ratio $I_C/I_S$ being larger or equal to 0.2 and smaller or equal to 2.0.

4. The powder according to claim 1, wherein the Si-free carbonaceous particles comprising graphitic domains are characterized by a number-based size distribution having a d50, the d50 being smaller than or equal to 25 µm and larger than or equal to 6 µm.

5. The powder according to claim 1, wherein the Si-free carbonaceous particles comprising graphitic domains are made of at least one of the following materials: exfoliated graphite, expanded graphite, graphene nanoplatelets.

6. The powder according to claim 1, wherein the silicon-based particles are characterized by a number-based size distribution having a d50, the d50 being larger than or equal to 20 nm and smaller than or equal to 150 nm.

7. The powder according to claim 1, having a silicon content C expressed in weight percent (wt %), wherein 10 wt % ≤ C ≤ 60 wt %.

8. The powder according to claim 1, having a silicon content C and an oxygen content D, both expressed in weight percent (wt %), wherein D ≤ 0.15 C.

9. The powder according to claim 1, wherein the first number-based fraction of particles is at least 0.2 and at most 0.8, with respect to a minimum number of 100 particles comprised in the powder.

10. The powder according to claim 1, wherein the second number-based fraction of particles is at least 0.2 and at most 0.8, with respect to a minimum number of 100 particles comprised in the powder.

11. The powder according to claim 1, comprising pores.

12. The powder according to claim 1, wherein the particles of the powder have a volume-based particle size distribution having a D10, a D50 and a D90, with 1 µm ≤ D10 ≤ 10 µm, 8 µm ≤ D50 ≤ 25 µm and 10 µm ≤ D90 ≤ 40 µm.

13. The powder according to claim 1, having a BET surface area which is at most 10 m²/g.

14. The powder according to claim 1, characterised in that the matrix material is a product of the thermal decomposition of at least one of the following materials: polyvinyl alcohol (PVA), polyvinyl chloride (PVC), sucrose, coal-tar pitch, petroleum pitch, lignin, and a resin.

15. The powder according to claim 1, wherein said particles comprising a carbonaceous matrix material and silicon-based particles dispersed therein are free of graphitic domains having a size larger than 2 nm.

16. The powder according to claim 13, having a BET surface area which is at most 5 m²/g.

17. The battery comprising a powder according to claim 1.

* * * * *